US008244905B2

(12) United States Patent
Bhatt et al.

(10) Patent No.: US 8,244,905 B2
(45) Date of Patent: Aug. 14, 2012

(54) ROUTING MECHANISMS FOR MESSAGING APPLICATIONS USING AN ENHANCED GATEWAY CONTROL FUNCTION

(75) Inventors: Jaydutt Bharat Bhatt, Naperville, IL (US); Sreenivas Katragadda, Aurora, IL (US)

(73) Assignee: Alcatel Lucent, Paris (FR)

( * ) Notice: Subject to any disclaimer, the term of this patent is extended or adjusted under 35 U.S.C. 154(b) by 439 days.

(21) Appl. No.: 12/384,043

(22) Filed: Mar. 31, 2009

(65) Prior Publication Data

US 2010/0250680 A1    Sep. 30, 2010

(51) Int. Cl.
*G06F 15/16* (2006.01)

(52) U.S. Cl. ........................................ 709/234; 709/238

(58) Field of Classification Search .......... 709/200–203, 709/217–235, 236, 238
See application file for complete search history.

(56) References Cited

U.S. PATENT DOCUMENTS

| | | | | |
|---|---|---|---|---|
| 5,966,431 | A * | 10/1999 | Reiman et al. | 379/115.01 |
| 6,016,350 | A * | 1/2000 | Funabe et al. | 713/153 |
| 6,718,168 | B2 * | 4/2004 | Ala-Luukko et al. | 455/412.1 |
| 7,003,571 | B1 * | 2/2006 | Zombek et al. | 709/227 |
| 7,054,304 | B2 * | 5/2006 | Wang | 370/352 |
| 7,058,036 | B1 * | 6/2006 | Yu et al. | 370/335 |
| 7,337,910 | B2 * | 3/2008 | Cartmell et al. | 209/245 |
| 7,458,184 | B2 * | 12/2008 | Lohtia | 455/456.3 |
| 8,001,197 | B2 * | 8/2011 | Hutchison et al. | 709/206 |
| 2002/0126708 | A1 * | 9/2002 | Skog et al. | 370/522 |
| 2002/0159463 | A1 * | 10/2002 | Wang | 370/401 |
| 2003/0142681 | A1 * | 7/2003 | Chen et al. | 370/401 |
| 2004/0148406 | A1 * | 7/2004 | Shima | 709/228 |
| 2005/0243987 | A1 * | 11/2005 | Polouchkine et al. | 379/201.01 |
| 2007/0192492 | A1 * | 8/2007 | Okazaki | 709/226 |
| 2007/0275688 | A1 * | 11/2007 | Sohn et al. | 455/403 |
| 2010/0042674 | A1 * | 2/2010 | Pantalone et al. | 709/203 |
| 2010/0293237 | A1 * | 11/2010 | Kramarz-Von-Kohout et al. | 709/206 |

* cited by examiner

*Primary Examiner* — Moustafa M Meky

(74) *Attorney, Agent, or Firm* — Carmen Patti Law Group, LLC

(57) ABSTRACT

Exemplary method and apparatuses for routing messaging traffic from a calling party in an Internet Protocol Multimedia Subsystem (IMS) network to a server in a destination network that serves a called party via the most direct route are provided. A telephone number mapping (ENUM)/Domain Name System (DNS) database, pre-provisioned to receive and respond to query messages based on an identifier of the called party and an application specific service type, e.g., short message service (SMS) or instant messaging (IM), may be accessed by a node in the calling party's IMS network to determine an address of the server in the destination network. Messaging traffic may be routed to the destination network or server based on content type or destination digits when ENUM/DNS database based routing mechanisms fail. Furthermore, routing of messaging traffic originating in an enterprise network and routing through the public switched telephone network (PSTN) is enabled.

21 Claims, 6 Drawing Sheets

ROUTING MECHANISMS FOR MESSAGING APPLICATIONS USING AN ENHANCED GATEWAY CONTROL FUNCTION

TECHNICAL FIELD

This invention relates to the art of telecommunication systems, and more particularly to telecommunication systems which provide routing of messaging traffic in an Internet Protocol Multimedia Subsystem (IMS) network.

BACKGROUND

The Internet Protocol Multimedia Subsystem (IMS) refers to a core network that supports multimedia services based on a future evolution of 3G networks, where there exists only a single core network supporting convergent voice and data services, i.e., multimedia services. The multimedia services are based on Voice over Internet Protocol for signaling and media transport. An IMS core network consists of a variety of standardized functional elements, including, but not limited to, one or more instances of a Call Session Control Function (CSCF), Breakout Gateway Control Function (BGCF), Media Gateway Control Function (MGCF), Home Subscriber Server (HSS), Media Gateways (MGW), and an application server (AS). Signaling within the IMS core network is based on the Session Initiation Protocol (SIP) using any interface compatible with the Internet Protocol (IP). Herein, IMS is defined as the system specified by the Third Generation Partnership Project (3GPP), Third Generation Partnership Project 2 (3GPP2) and European Telecommunications Standards Institute (ETSI) Telecommunications and Internet converged Services and Protocols for Advanced Networking (TISPAN).

Messaging applications, e.g., short message service (SMS), are used extensively in the existing Code Division Multiple Access (CDMA), Global System for Mobile Communications (GSM) and Universal Mobile Telecommunications System (UMTS) networks and are considered key services for deployment in IMS networks. In order for network operators to maintain a strong competitive position in the telecom industry, upgrades of existing networks and the introduction of new IP multimedia revenue generating services are necessary.

SUMMARY

A routing mechanism for messaging applications which uses an enhanced gateway function is provided. More specifically, in one embodiment of the invention, provided is a method that includes receiving a message from a first terminal; generating a query to a database based on an identifier of the second terminal and a service type indicator in the message to determine a destination server in the terminating network that directly serves the second terminal; and routing the message to the destination server via a direct path based on receipt of an address indicator from a successful database query.

In another embodiment, the provided method includes receiving a query message from a Serving Call Session Control Function (S-CSCF) ), the query message including an identifier of a terminal and a service type indicator; querying a database for an address of a server that directly serves the terminal based on the identifier of the terminal and the service type indicator, said address being an Internet Protocol address or a Uniform Resource Identifier, the database being populated with at least one Naming Authority Pointer (NAPTR) record for a service type; and responding to the S-CSCF with the address when a Naming Authority Pointer (NAPTR) record corresponding to the identifier of the terminal and the service type indicator is determined.

One embodiment of the invention provides an apparatus that has means for receiving a message from a first mobile terminal to a second mobile terminal; means for generating a query to a database based on an identifier of the second terminal and a service type indicator in the message to determine a destination server in a terminating network that directly serves the second mobile terminal; and means for transmitting the message to the destination server via a direct route based on receipt of an address indicator from a successful database query.

In another embodiment, the provided apparatus has a Serving Call Session Control Function (S-CSCF) operable to: receive a message from a first mobile terminal to a second mobile terminal, generate a query to a telephone number mapping (ENUM)/Domain Name System (DNS) database based on an identifier of the second mobile terminal and a service type indicator in the message to determine a destination server that directly serves the second mobile terminal, and transmit the message to the destination server via a direct route based on receipt of an address from a successful ENUM/DNS database query; and a Breakout Gateway Control Function (BGCF) operable to: receive the message from the S-CSCF when the query to the ENUM/DNS database is not successful and transmit the message to the destination server; wherein the successful ENUM/DNS database query occurs when the ENUM/DNS database is operable to receive and respond to queries based on the service type, and the ENUM/DNS database is populated with at least one Naming Authority Pointer (NAPTR) record for the service type.

Yet another apparatus embodiment includes a Routing Control Function (RTCF) operable to: receive a message from a first mobile terminal located in an enterprise network to a second mobile terminal located in a terminating network, generate a query to a telephone number mapping (ENUM)/Domain Name System (DNS) database based on an identifier of the second mobile terminal and a service type indicator in the message to determine a destination server that directly serves the second mobile terminal, and transmit the message to the destination server via a direct route based on receipt of an address from a successful ENUM/DNS database query; and a Breakout Gateway Control Function (BGCF) operable to: receive the message from the RTCF when the query to the ENUM/DNS database is not successful and transmit the message to the destination server; wherein the successful ENUM/DNS database query occurs when the ENUM/DNS database is operable to receive and respond to queries based on the service type, and the ENUM/DNS database is populated with at least one Naming Authority Pointer (NAPTR) record for the service type.

Still yet another apparatus embodiment has means for receiving a query message from a Serving Call Session Control Function (S-CSCF)), the query message including an identifier of a terminal and a service type indicator; means for querying a database for an address of a destination server that directly serves the terminal based on the identifier of the terminal and the service type indicator, said address being an Internet Protocol address or a Uniform Resource Locator, the database being populated with at least one Naming Authority Pointer (NAPTR) record for a service type; and means for responding to the S-CSCF with the address when a Naming Authority Pointer (NAPTR) record corresponding to the identifier of the terminal and the service type indicator is determined.

DETAILED DESCRIPTION

Exemplary techniques for routing messaging traffic from an originator in an Internet Protocol Multimedia Subsystem (IMS) network to a destination network or server through the most direct, i.e., shortest, route based on a query to a telephone number mapping (ENUM)/Domain Name System (DNS) database with application specific service type are provided. Further exemplary techniques allow network routing of messaging traffic to the destination network or server based on content type or destination digits when normal ENUM/DNS based routing mechanisms fail. Furthermore, additional exemplary techniques allow the network to route messaging traffic originating in an enterprise network through the public switched telephone network (PSTN) to the destination network or server.

Figure 1:
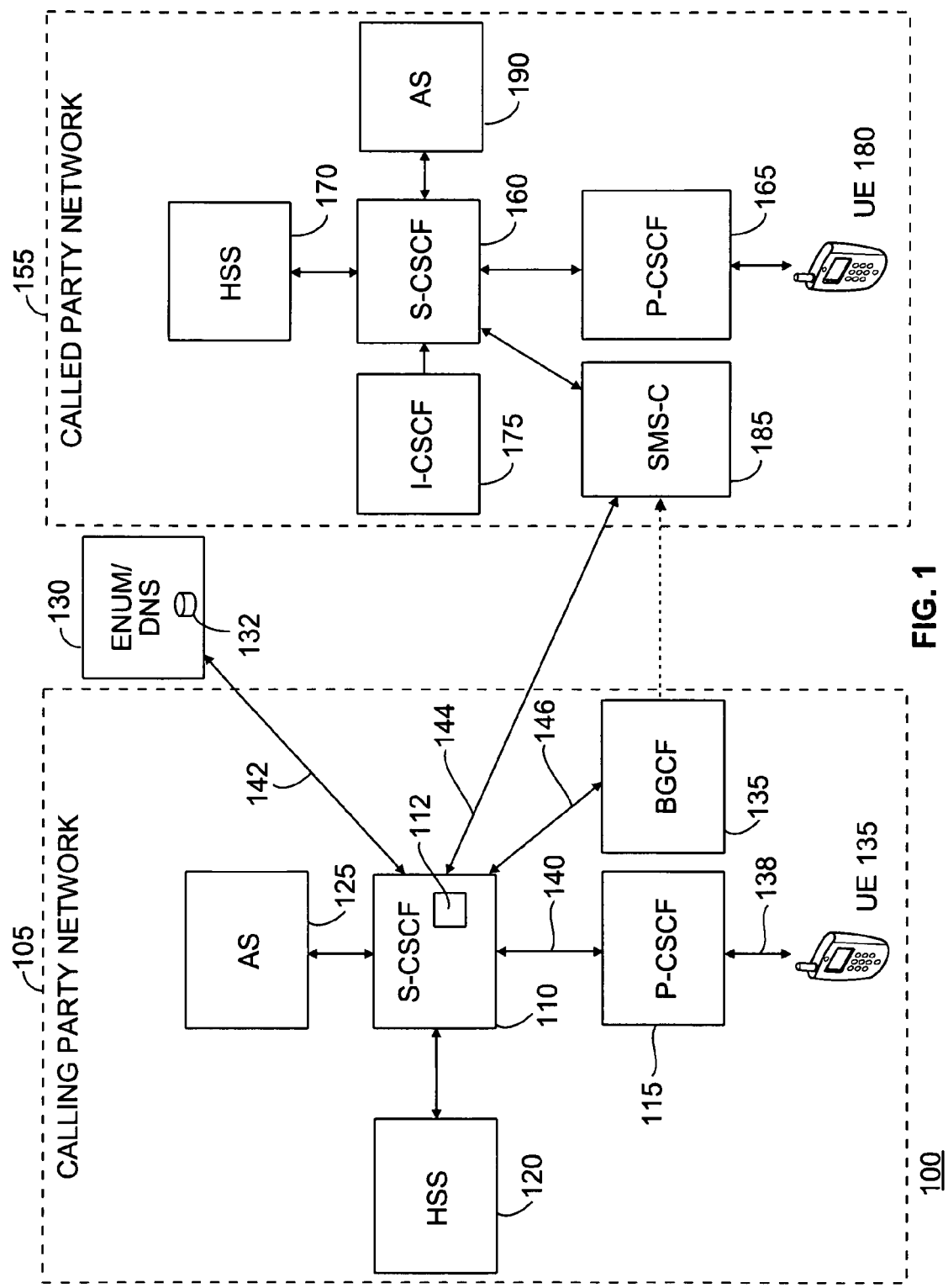
FIG. 1 shows an illustrative embodiment of an exemplary Internet Protocol Multimedia Subsystem (IMS) network arranged in accordance with the principles of the invention.

FIG. 1 shows an illustrative embodiment of an exemplary IMS network arranged in accordance with the principles of the invention. As shown in FIG. 1, architecture 100 comprises Serving Call Session Control Function (S-CSCF) 110 which manages all session control functions in the Calling Party Network 105. S-CSCF 110 connects to Proxy Call Session Control Function (P-CSCF) 115, Home Subscriber Server (HSS) 120, application server (AS) 125, ENUM/DNS database 130, Breakout Gateway Control Function (BGCF) 135 and Called Network 155. User equipment (UE) 135 connects to P-CSCF 115. Also, architecture 100 comprises S-CSCF 160 which manages all session control functions in the Called Party Network 155. S-CSCF 160 connects to P-CSCF 165, HSS 170, Interrogate-CSCF (I-CSCF) 175, SMS Center (SMS-C) 185, and AS 190. UE 180 connects to P-CSCF 165. UE 135 and UE 180 are IP capable terminals. Note that in FIGS. 1-6, identical or analogous parts or elements are generally depicted by identical reference numerals.

HSS 120 is a database that supports the Calling Party Network 105 entities that actually handle calls. HSS 120 contains the subscription-related information, i.e., user profiles and preferences, performs authentication and authorization of the user, and may provide information about the user's physical location. HSS 120 provides an initial Filter Criteria (iFC), i.e., conditions associated with a Session Initiation Protocol (SIP) message and the identity of the application server to contact if the conditions are met, to S-CSCF 110 to evaluate when UE 135 registers with P-CSCF 115. HSS 170 performs analogous functions in Called Party Network 155 to support S-CSCF 160.

Application server 125 hosts and executes services, e.g., announcements, interactive voice responses, etc., and interfaces with S-CSCF 110 using the SIP protocol. S-CSCF 110 decides to which application server(s) the SIP message will be forwarded, in order to provide their services. AS 190 performs analogous functions in Called Party Network 155 to support S-CSCF 160.

ENUM/DNS database 130 provides query translation mechanisms for integration between IP networks, such as the Internet, and the PSTN. ENUM/DNS database 130 has processing logic which translates an E.164 number into an IP network identifier, e.g., an IP address. ENUM/DNS database 130 may contain one or more naming authority pointer (NAPTR) resource records that associate individual E.164 numbers with one or more IP network identifiers. A NAPTR record is a type of DNS record that supports regular-expression-based rewriting, where each network identifier within the NAPTR record may be differentiated based on a variety of parameters.

BGCF 135 is a SIP server that includes routing functionality based on telephone numbers. BGCF 135 may be used when calling from the IMS network to a phone in a circuit switched network, such as the PSTN.

I-CSCF 175, located at the edge of Called Party Network 155, may serve as the main point of contact for connections to subscribers served by Calling Party Network 105 or other IP networks. The IP address of I-CSCF 175 may be published in ENUM/DNS database 130 so that remote servers can find I-CSCF 175, and use it as a forwarding point for SIP packets to Called Party Network 155. As a result of receiving a SIP message, I-CSCF 175 may query HSS 170 for an IP address of a S-CSCF, e.g., S-CSCF 160, to forward the SIP message.

SMS-C 185 serves as a control point for the delivery of SMS messages. SMS-C 185 may have databases, not shown, that store text messages received for designated subscribers, and location and service information for subscribers. The databases may contain information regarding where to send text messages that arrive at SMS-C 185. For example, the databases may serve to link subscriber names, mobile terminals and landline telephone numbers, e-mail addresses, and internet protocol addresses. SMS-C 185 is considered to be an application server in Called Party Network 155.

P-CSCF 115 is the first point of contact for user devices, e.g., UE 135, to the Calling Party Network 105 and controls authentication of the user devices. P-CSCF 115 is assigned to UE 135 during registration, and does not change for the duration of the registration. P-CSCF 165 performs analogous functions in Called Party Network 155 to support UE 180.

Each of P-CSCF 115, P-CSCF 165, S-CSCF 110, and S-CSCF 160 are preferably embodied in one or more server apparatus, but may reside in one or more computing apparatus such as one or more mainframe computers or one or more soft switches or one or more processors or any combination of processors or computers configured to perform the functions described. P-CSCF 115, P-CSCF 165, S-CSCF 110, and S-CSCF 160 have interfaces for sending and receiving messages. S-CSCF 110 and/or S-CSCF 160 may each have one or more processors, e.g., processor 112, which execute program logic for sending queries to remote databases. The functions of processor 112 may be provided by a single dedicated processor, by a single shared processor, or by a plurality of individual processors, some of which may be shared. In the exemplary embodiment, software running on P-CSCF 115, P-CSCF 165, S-CSCF 110, and S-CSCF 160 facilitates the overall functionality of P-CSCF 115, P-CSCF 165, S-CSCF 110, and S-CSCF 160 as well as the described functions.

For purposes of illustration and example, a calling party in a first home network, e.g., Calling Party Network 105, initiates a communication session with a called party in a second home network, e.g., Called Party Network 155, by dialing a number, e.g., an E.164 number such as +1 7326715555, of the called party. In one embodiment, Calling Party Network 105 and Called Party Network 155 may both be IMS networks. In another embodiment, Calling Party Network 105 may be an IMS network and Called Party Network 155 may be a network having IMS network elements and existing PSTN network elements. The calling party may use an IP capable terminal, e.g., UE 135, to originate a text message, e.g., instant message (IM) or short message service (SMS), using client software resident on the IP capable terminal. The IP capable terminal may be an IMS single-mode mobile terminal or an IMS dual-mode mobile terminal. The IP capable terminal may encapsulate the message text in binary or base 64 encoding formats in the content of a SIP message.

For an IMS originated message, UE 135 routes the SIP message to P-CSCF 115 in Calling Party Network 105 via a communication channel, i.e., link 138. P-CSCF 115 routes a SIP INVITE message to S-CSCF 110 in Calling Party Network 105 via link 140. S-CSCF 110 may have one or more processors, e.g., processor 112, which execute program logic to send a query message to ENUM/DNS database 130, via link 142, on a Request Uniform Resource Indicator (URI) of the SIP INVITE message.

New application specific "service type" extensions for the query from the S-CSCF 110 to ENUM/DNS database 130 enable queries for different types of messaging traffic, e.g., IM, SMS, etc. S-CSCF 110 may have program logic executed by processor 112 that allows S-CSCF 110 to send the query with the new application specific "service type" extensions to ENUM/DNS database 130. The query message from S-CSCF 110 to ENUM/DNS database 130 may include a service type based on the content type of the incoming SIP INVITE message. The ENUM/DNS database should be populated by the service provider using service type in order to route messages directly to the target messaging server.

ENUM/DNS database 130, pre-provisioned for the new "service type" extensions, and configured to receive and respond to queries from S-CSCF 110, contains identities for subscribers in Calling Party Network 105 and Called Party Network 155. ENUM/DNS database 130 receives the query message from S-CSCF 110 via link 142. Next, ENUM/DNS database 130 accesses an internal database, e.g., database 132, using an identifier, e.g., the called E.164 number, and the service type to determine, via a query translation mechanism, a destination associated with the E.164 number and the "service type" located in the "service type" extension of the query. If ENUM/DNS database 130 is populated with NAPTR resource records for "service type" queries and the destination address is IP capable, the query to ENUM/DNS database 130 will be successful. Then ENUM/DNS database 130 responds to S-CSCF 110 with an address, e.g., an IP address or URL, which identifies a destination, e.g., a destination messaging server or destination network, to route the SIP INVITE message.

Illustratively, if the service type is SMS, then ENUM/DNS database 130 provides an address that corresponds to the SMS Center that serves the called E.164 address in the SIP INVITE message. Also illustratively, if the service type is Instant Message (IM), then ENUM/DNS database 130 provides an address to an IM server that serves the called E.164 address in the SIP INVITE message. Next, S-CSCF 110 may transmit the SIP INVITE message, via the most direct route, e.g., link 144, using the address provided from the query, to the destination messaging server, e.g., SMS-C 185, which directly serves the called party. In effect, the transmitted SIP INVITE message bypasses, i.e., avoids, the entry point, i.e., I-CSCF 175, of Called Party Network 155 when routed to SMS-C 185.

If the query to ENUM/DNS database 130 is not successful, i.e., ENUM/DNS database 130 is not populated with NAPTR records for the service type, the destination address and/or routing is not defined in ENUM/DNS database 130, then S-CSCF 110 may route the SIP INVITE message to BGCF 135 via link 146. BGCF 135 contains routing tables pre-provisioned for messaging traffic. The routing table may be keyed by the "content-type" received in the incoming SIP INVITE message. The routing table of BGCF 135 provides the following options to route the SIP INVITE message:

i. Based on the content-type of the incoming message—the routing tables will provide the capability to provision the SIP URI of the destination network or destination server.

ii. Based on the Request URI destination digits—the routing tables will provide the capability to analyze the destination digits and provision SIP URI of the destination network or server based on destination digits.

iii. Reject messaging traffic for a particular content-type or destination digits.

BGCF 135 routes the SIP INVITE message to the destination network or server, e.g., SMS-C 185, on a path that bypasses an entry point of Called Party Network 155 based on the results of the routing table query. (See dashed line from BGCF 135 to SMS-C 185 in FIG. 1.)

Figure 2:
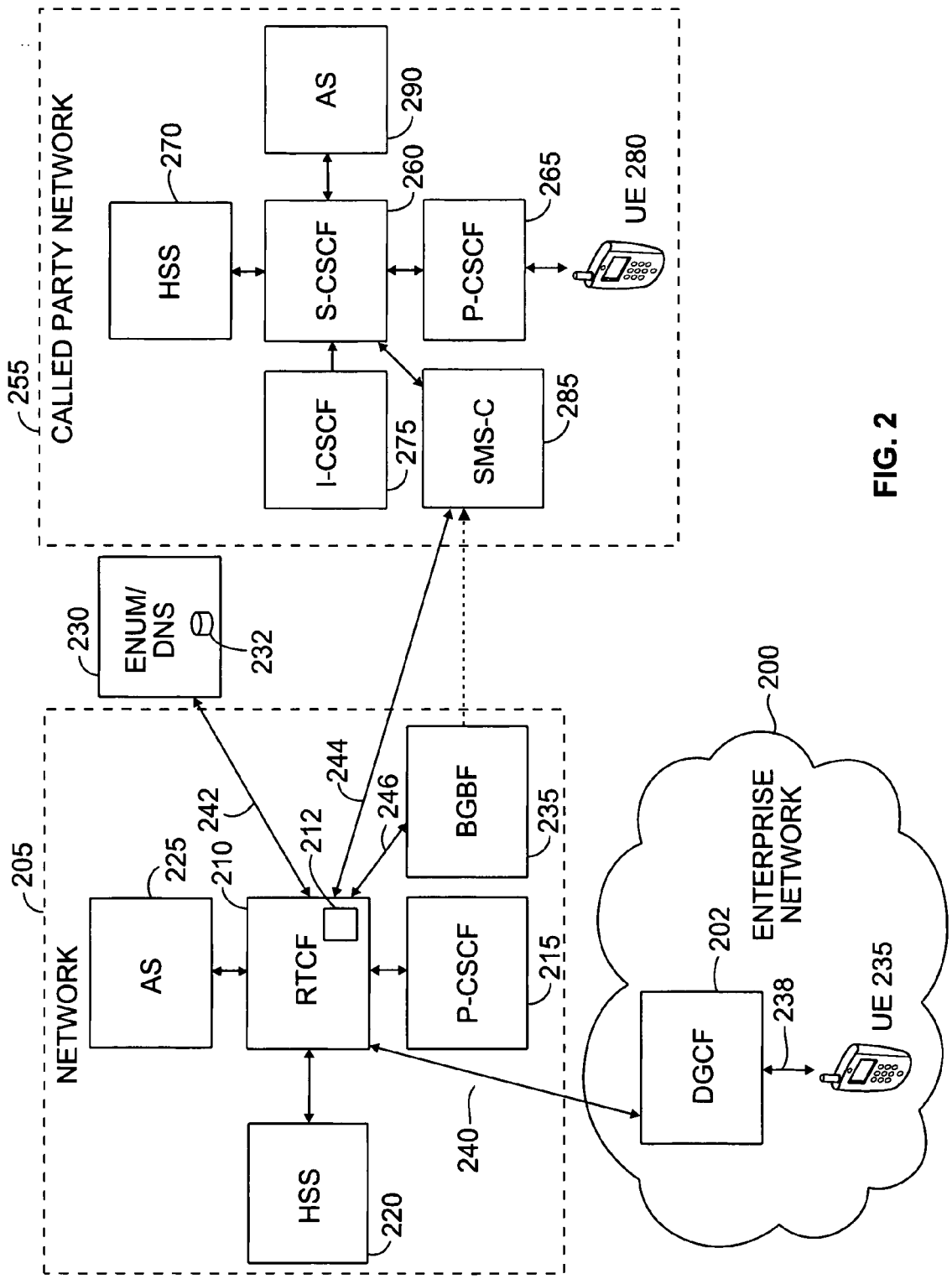
FIG. 2 shows another illustrative embodiment of an exemplary Internet Protocol Multimedia Subsystem (IMS) network arranged in accordance with the principles of the invention.

FIG. 2 shows another illustrative embodiment of an Internet Protocol Multimedia Subsystem (IMS) network arranged in accordance with the principles of the invention. As shown in FIG. 2, Routing Control Function (RTCF) 210, which manages all session control functions in Network 205, connects to P-CSCF 215, HSS 220, AS 225, ENUM/DNS database 230, BGCF 235 and Called Network 255. Also, S-CSCF 260 connects to P-CSCF 265, HSS 270, I-CSCF 275, SMS-C 285, and AS 290. UE 280 connects to P-CSCF 265. Network 205 and Called Network 255 may be owned by one service provider or different service providers.

In FIG. 2, messaging traffic originating in a corporate network, i.e., Enterprise Network 200, is routed using the service provider networks, i.e., Network 205 and Called Network 255. The SIP INVITE message originating in Enterprise Network 200 may be routed from the calling party's IP capable terminal, e.g., UE 235, to a Digit Control Function (DGCF) 202 via link 238. DGCF 202 filters non-IMS calls originated in Enterprise Network 200 and routes them to their destination without using IMS resources. Also, DGCF 202 may forward the SIP INVITE message to RTCF 210 in Network 205 via link 240.

RTCF 210 may have one or more processors, e.g., processor 212, which execute program logic to send a query message to ENUM/DNS database 230, via link 242, based on the Request URI digits and using a service type based on the message content type header. If ENUM/DNS database 230 is populated for "service type" queries and the destination address is IP capable, i.e., the ENUM/DNS query is successful, then ENUM/DNS database 230 retrieves an address, e.g., an IP address or URL, from internal database 232 which identifies a destination to route the SIP INVITE message. Next, ENUM/DNS database 230 responds to RTCF 210 with the address. RTCF 210 may route the SIP INVITE message to the destination messaging server, e.g., SMS-C 285, in Called Party Network 255 via link 244, bypassing the entry point, e.g., I-CSCF 275, in Called Party Network 255. If the query to ENUM/DNS database 230 fails, RTCF 210 may send the SIP INVITE message to BGCF 235 via link 246. BGCF 235 may route the message based on content type or Request URI digits to the destination network or server on a path that bypasses an entry point of Called Party Network 255. (See dashed line from BGCF 235 to SMS-C 285 in FIG. 2.)

Advantageously, the methods according to the invention allow service providers to route messaging traffic directly to a destination server rather than routing messaging traffic to an entry point of a terminating network and then using the terminating S-CSCF to deliver the messaging traffic to the destination server, thereby avoiding required use of multiple network elements for the end-to-end delivery of messages. Also advantageously, the exemplary embodiments provided may assist service providers in avoiding overloads of their networks which may occur when routing large volumes of messaging traffic to the entry point of the terminating network and result in cost and maintenance issues. Further advantageously, messaging traffic may be routed via the flexibility of end-to-end routing provided by IP-based networks using embodiments of the invention.

Figure 3:
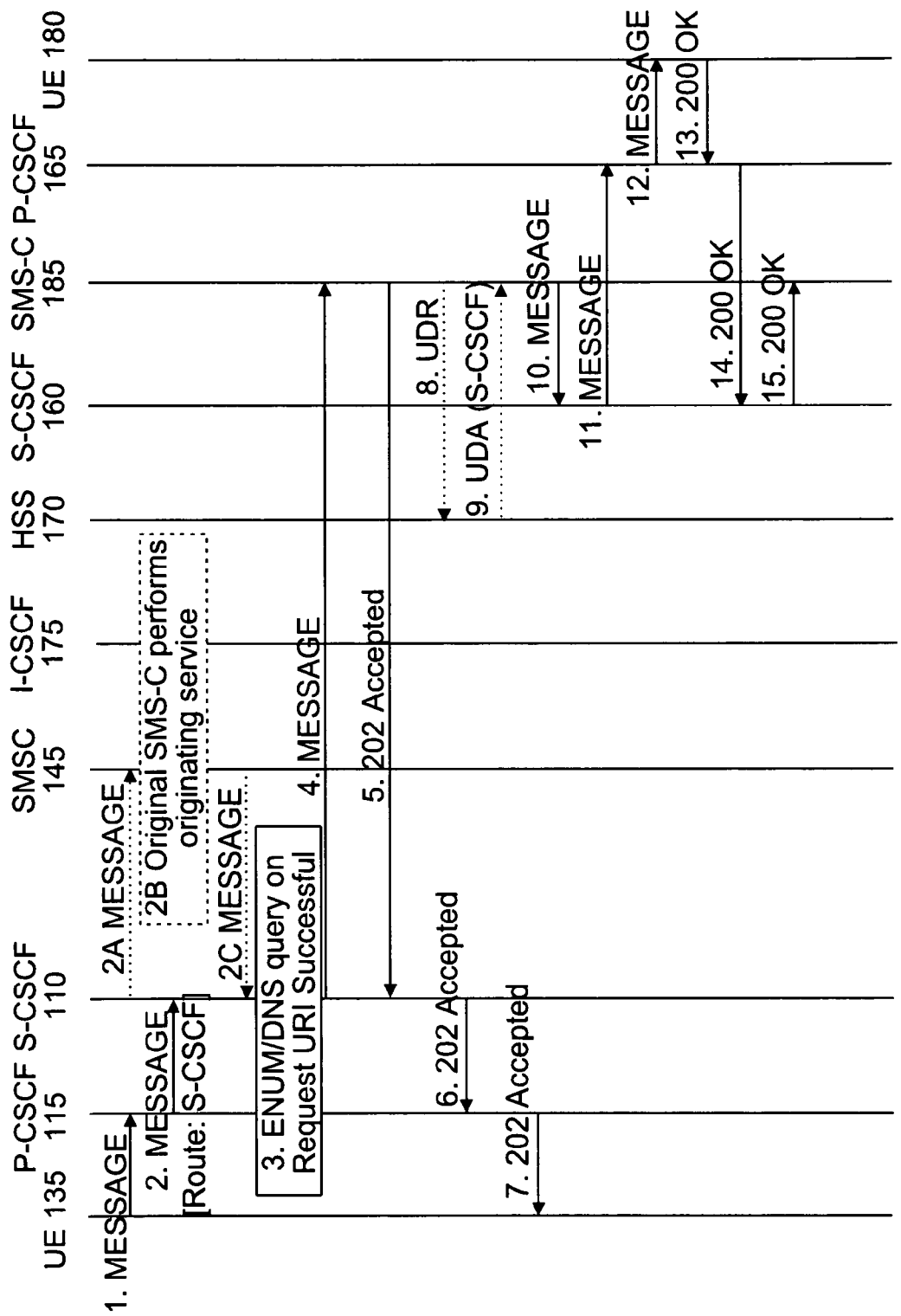
FIG. 3 shows an illustrative call flow for an exemplary method of operating an embodiment of the invention arranged in accordance with the principles of the invention.

FIG. 3 shows an illustrative call flow for an exemplary method of operating an embodiment of the invention arranged in accordance with the principles of the invention. In FIG. 3, the terminating party is an IMS capable mobile terminal and its routing entry is populated in the ENUM/DNS database with service type. FIG. 3 shows the methodology for direct routing to the destination messaging server for SMS.

At 1, UE 135 originates a SMS message. The SMS client on UE 135 encapsulates the SMS content in a SIP message and sends the SIP message to P-CSCF 115. The content type of the SIP message is set to SMS content type.

At 2, P-CSCF 115 forwards the SIP message to S-CSCF 110, which is assigned to service the subscriber of UE 135.

At 2A, if the service provider requires all Mobile Originating (MO) SMS messages to be routed through the originator's SMS-C, i.e., SMS-C 145, an initial Filter Criteria (iFC) for the MO SMS is provisioned in HSS 120 and downloaded to S-CSCF 110 during registration. When S-CSCF 110 receives a SIP message for an originating session and a SMS content type, an iFC will proxy the SIP message to SMS-C 145. S-CSCF 110 inserts its own SIP URI in the route header of the SIP message with an original dialog identifier. This original dialog identifier will be used to associate the response from SMS-C 145.

At 2B, SMS-C 145 performs the required SMS origination services, e.g., generating originating SMS charging records, etc.

At 2C, when SMS-C 145 completes SMS origination services, SMS-C 145 sends the SIP message to S-CSCF 110 for routing to the destination network/server. SMS-C 145 places the SIP-URI of S-CSCF 110 with the original dialog identifier in the topmost route header.

At 3, S-CSCF 110 determines the destination address based on the URI in the Request-URI and perform a query to ENUM/DNS database 130 based on the E. 164 number in the URI. The query to ENUM/DNS database 130 includes a service type indicator, e.g., "sms" or "im", depending on the content type of the SIP message. In order to perform direct routing to the destination server, ENUM/DNS database 130 needs to be populated with NAPTR records for the service type. For example, NAPTR 10 100 "u" "E2U+sms" "!^.*$!sip:smsc.server.com!"

NAPTR 10 100 "u" "E2U+im" "!^.*$!sip:im.server.com!".

At 4, if the query to ENUM/DNS database 130 is successful, S-CSCF 110 routes the message to the SMS-C 185 in the destination network.

At 5, SMS-C 185 stores the message and acknowledges receipt of the message with response, e.g., a 202 Accepted response.

At 6-7, the 202 Accepted response is relayed back to UE 135.

At 8, SMS-C 185 performs a query to HSS 170 to determine the IMS user state and S-CSCF, i.e., S-CSCF 160, assigned to service the destination user, i.e., UE 180.

At 9, if UE 180 is registered in the IMS network, HSS 170 returns the address of S-CSCF 160. Note: If the query to HSS 170 fails, e.g., UE 180 is not IMS registered, SMS-C 185 may attempt a traditional circuit delivery. If UE 180 is not available in circuit network, SMS-C 185 may subscribe with HSS 170 for notification when UE 180 registers.

At 10, SMS-C 185 sends a SIP message with encapsulated SMS delivery content to S-CSCF 160. SMS-C 185 inserts a termination tag (ottag=ue_term) to S-CSCF 160 SIP URI. The termination tag allows S-CSCF 160 to identify the message and provide mobile termination treatment by forwarding the message to P-CSCF 165.

At 11, S-CSCF 160 forwards the SIP message to P-CSCF 165.

At 12, P-CSCF 165 sends the SIP message to UE 180.

At 13, the SMS client of UE 180 acknowledges receipt with response, e.g., a 200 OK.

At 14-15, the 200 OK is relayed back to SMS-C 185.

Figure 4:
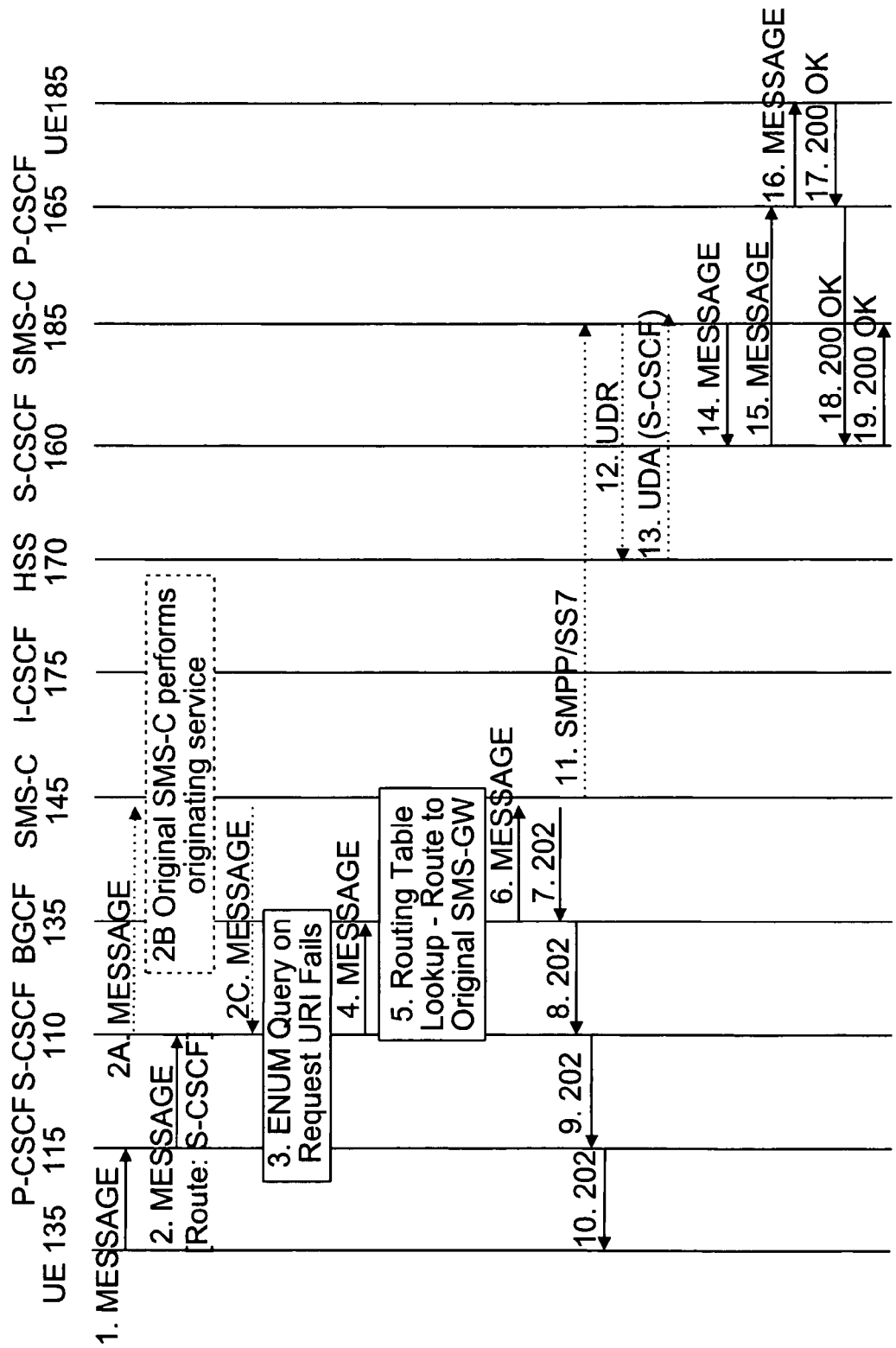
FIG. 4 shows another illustrative call flow for an exemplary method of operating an embodiment of the invention arranged in accordance with the principles of the invention.

FIG. 4 shows another illustrative call flow for an exemplary method of operating an embodiment of the invention arranged in accordance with the principles of the invention. In FIG. 4, the called party's terminal is IMS capable, but the routing entries to the called party's terminal are not populated in the ENUM/DNS database. The message is default routed to the BGCF. The BGCF routes the message to the destination based on its routing table entries. The BGCF tables are populated to route based on SIP content-type. Also, it is possible to populate the BGCF tables to route the message based on Request URI destination digits if they are in TEL URL or SIP URL (user=phone) format.

At 1-2, UE 135 originates a SMS message. The SMS client on UE 135 encapsulates the SMS content in a SIP message and sends the SIP message to P-CSCF 115. The content type of the SIP message is set to SMS content type.

At 3, S-CSCF 110 routes the SIP message based on the URI in the Request-URI. If the URI contains TEL URL or SIP URI with parameter user=phone, S-CSCF 110 performs a query to ENUM/DNS database 130. In this case, ENUM/DNS database 130 does not contain the destination address for the E.164 number and the query fails.

At 4, when the query to ENUM/DNS database 130 fails, S-CSCF 110 sends the SIP message to BGCF 135.

At 5, BGCF 135 checks its routing tables using "content-type" header in the SIP message. The routing tables are provisioned to route SIP messages with SMS content type to the originator's SMS-C, i.e., SMS-C 145. Note: The routing tables can be alternatively provisioned to route the SIP message based on Request URI.

At 6, BGCF 135 sends the SIP message to SMS-C 145. BGCF 135 inserts a routing tag (ottag=route) in the Request URI and route headers. The routing tag allows SMS-C 145 to route the SIP message directly to the SMS-C 185 in the terminating network using legacy SS7/Short Message Peer-to-Peer (SMPP) protocols.

At 7, SMS-C 145 stores the message and acknowledges receipt with response, e.g., a 202 Accepted response.

At 8-10, the 202 Accepted response is relayed back to UE 135.

At 11, SMS-C 145 performs the conversion and sends the SMS message to SMS-C 185 using SMPP or SS7 protocol.

At 12, SMS-C 185 performs a query to HSS 170 to determine the IMS user state and S-CSCF assigned to service UE 180.

At 13, if UE 180 is registered in an IMS network, HSS 170 returns the address of S-CSCF 160. Note: If the query to HSS 170 fails, e.g., UE 180 is not registered in an IMS network, SMS-C 185 may attempt a traditional circuit delivery. If UE 180 is not available in the circuit network, SMS-C 185 may subscribe with HSS 170 for notification when UE 180 registers.

At 14, SMS-C 185 sends a SIP message with encapsulated SMS delivery content to S-CSCF 160. SMS-C 185 inserts a termination tag (ottag=ue_term) to the S-CSCF 160 SIP URI. The termination tag allows S-CSCF 160 to identify the message and provide mobile termination treatment by forwarding the message to P-CSCF 165.

At 15, S-CSCF 160 forwards the SIP message to P-CSCF 165.

At 16, P-CSCF 165 sends the SIP message to UE 180.

At 17, the SMS client of UE 180 acknowledges receipt with response, e.g., a 200 OK response.

At 18-19, the 200 OK is relayed back to SMS-C 185.

Figure 5:
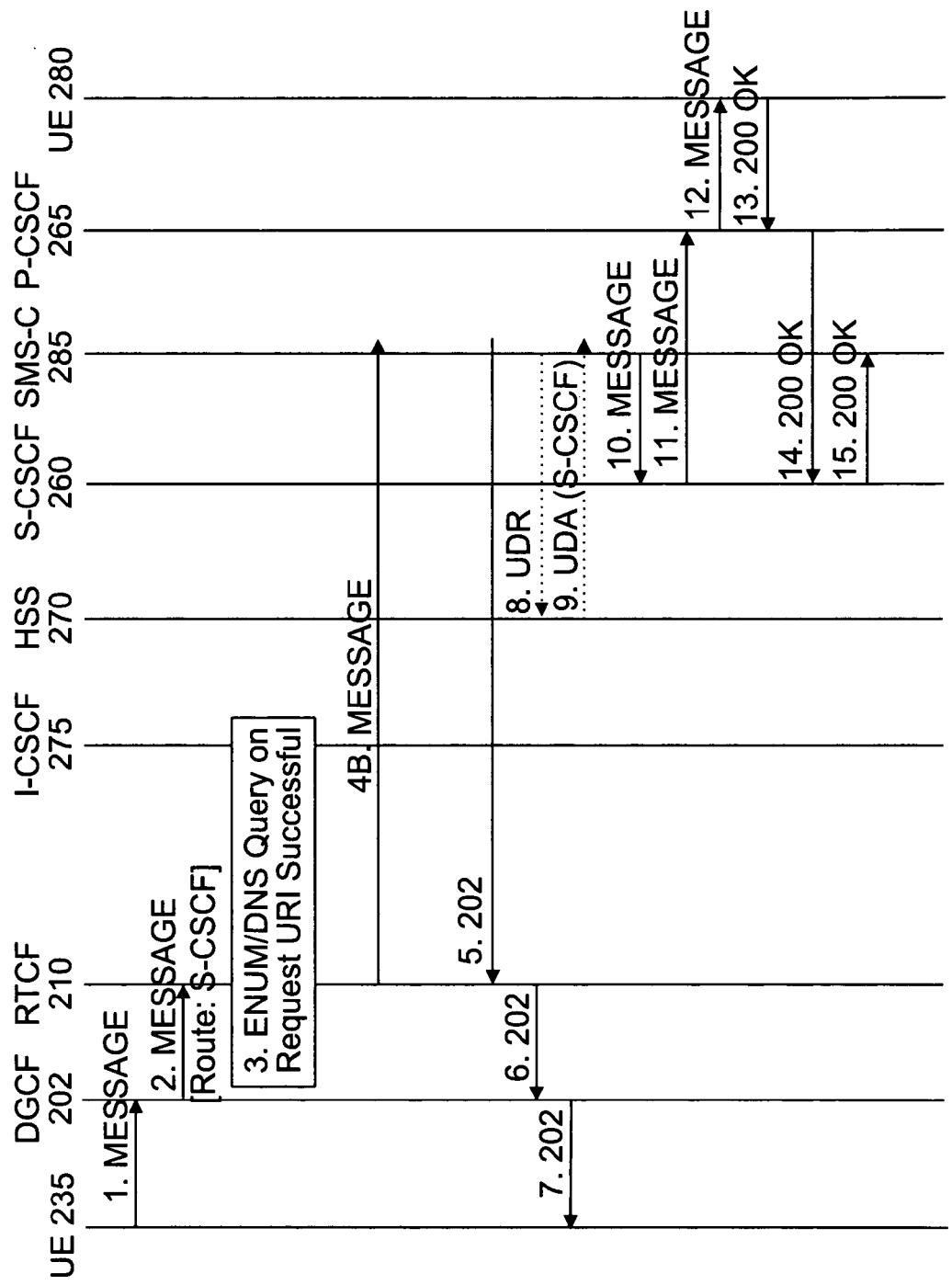
FIG. 5 shows yet another illustrative call flow for an exemplary method of operating an embodiment of the invention arranged in accordance with the principles of the invention.

FIG. 5 shows yet another illustrative call flow for an exemplary method of operating an embodiment of the invention arranged in accordance with the principles of the invention. In FIG. 5, the called party's terminal is IMS capable, and its routing entry is populated in the ENUM/DNS database with the service type. FIG. 5 shows the methodology for routing messages originating in enterprise networks over commercial IMS networks.

At 1-2, a non-IMS IP terminal originating from an enterprise customer terminates to a Digit Control Function (DGCF). The DGCF performs a Digit and Domain Analysis and determines that the message is originating from the known host, performs the called party normalization, and routes the message to RTCF 210.

At 3, RTCF 210 determines the destination address based on the URI in the Request-URI and performs a query to ENUM/DNS database 130 based on the E.164 number in the URI. The query to ENUM/DNS database 230 includes a service type indicator, e.g., "sms" or "im", depending on the content type of the SIP message. In order to perform direct routing to the destination server, ENUM/DNS database 230 needs to be populated with NAPTR records for the service type. For example, NAPTR 10 100 "u" "E2U+sms" "!^.*$!sip:smsc.server.com!"

NAPTR 10 100 "u" "E2U+im" "!^.*$!sip:im.server.com!"

At 4, if the query to ENUM/DNS database 230 is successful, RTCF 210 routes the message to SMS-C 285.

At 5, SMS-C 285 stores the message and acknowledges receipt with response, e.g., a 202 Accepted response.

At 6-7, the 202 Accepted response is relayed back to UE 235.

At 8, SMS-C 285 performs a query to HSS 270 to determine the IMS user state and S-CSCF assigned to service the called party using UE 280.

At 9, if UE 280 is registered in IMS, HSS 270 returns the address of the S-CSCF that services UE 280. Note: If the query to HSS 270 fails, e.g., UE 280 is not IMS registered, the SMS-C 285 may attempt a traditional circuit delivery. If UE 280 is not available in the circuit network, then SMS-C 285 may subscribe with HSS 270 for notification when UE 280 registers.

At 10, SMS-C 285 sends a SIP message with encapsulated SMS delivery content to S-CSCF 260. SMS-C 285 inserts a termination tag (ottag=ue_term) to the S-CSCF 260 SIP URI. The termination tag allows S-CSCF 260 to identify the message and provide mobile termination treatment by forwarding the message to P-CSCF 265.

At 11, S-CSCF 260 forwards the message to P-CSCF 265.

At 12, P-CSCF 265 sends the message to UE 280.

At 13, the SMS client of UE 280 acknowledges receipt with response, e.g., a 200 OK response.

At 14-15, the 200 OK is relayed back to SMS-C 285.

Figure 6:
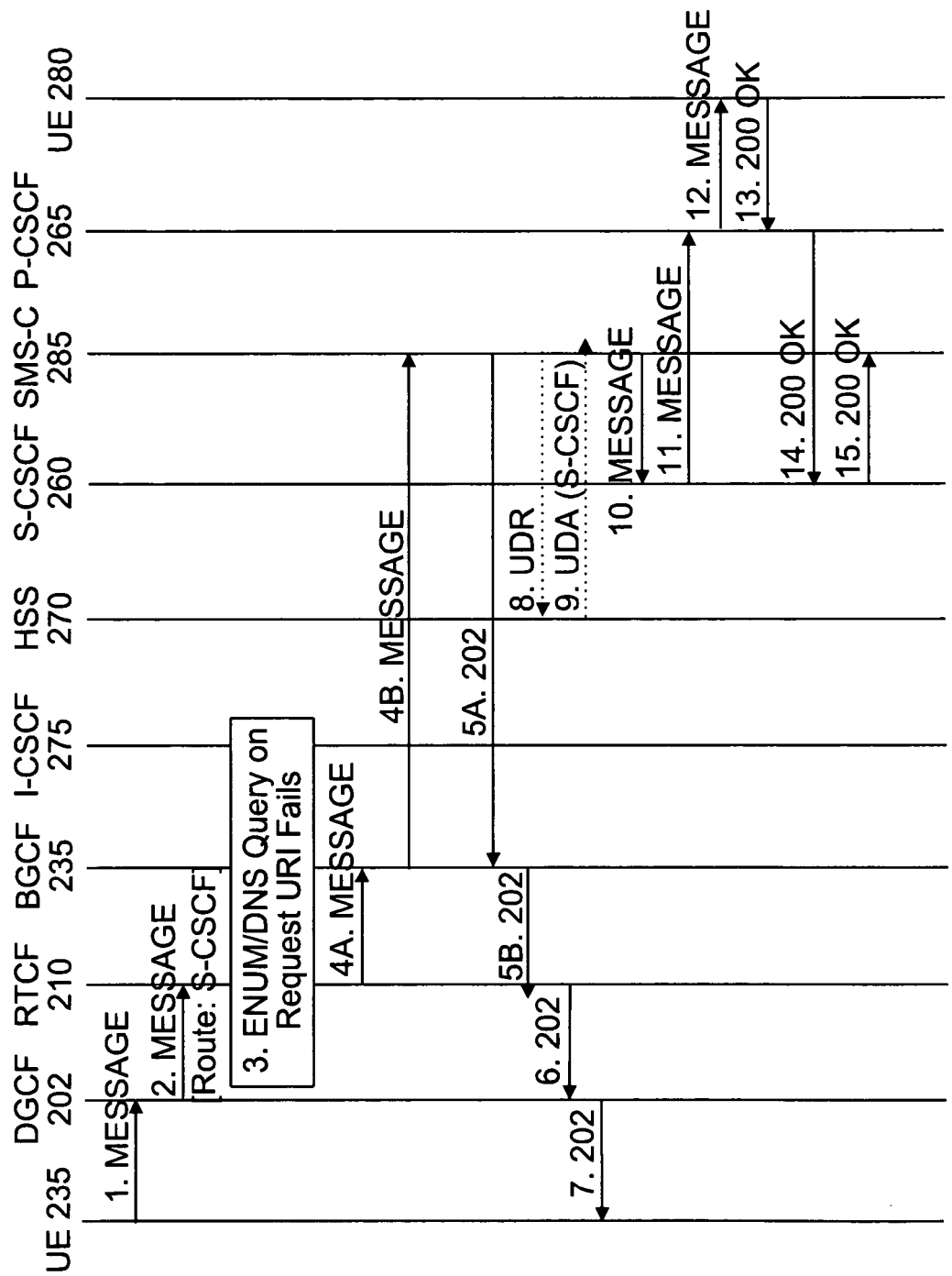
FIG. 6 shows still yet another illustrative call flow for an exemplary method of operating an embodiment of the invention arranged in accordance with the principles of the invention.

FIG. 6 shows still yet another illustrative call flow for an exemplary method of operating an embodiment of the invention arranged in accordance with the principles of the invention. In FIG. 6, the called party's terminal is IMS capable, but the routing entries to the called party's terminal are not populated in the ENUM/DNS database. The SIP message is default routed to the BGCF. The BGCF routes the SIP message to the destination based on routing table entries internal to the BGCF. The BGCF tables are populated to route based on SIP content-type. Also, it is possible to populate the BGCF tables to route the SIP message based on Request URI destination digits if the Request URI destination digits are in TEL URL or SIP URL (user=phone) format.

At 1-2, a non-IMS IP terminal originating from an enterprise customer terminates to Digit Control Function (DGCF). The DGCF performs the Digit and Domain Analysis, determines that the message is originating from the known host, performs the called party normalization, and routes the SIP message to RTCF 210.

At 3, RTCF 210 determines the destination address based on the URI in the Request-URI and performs a query to ENUM/DNS database 230 based on the E.164 number in the URI.

At 4A, when the query to ENUM/DNS database 230 fails, RTCF 210 routes the SIP message to BGCF 235.

At 4B, BGCF 235 checks its routing tables using "content-type" header in the SIP message. The routing tables are provisioned to route SIP message with SMS content type to SMS-C 285. Note: The routing tables may be alternatively provisioned to route the SIP message based on Request URI.

At 5A, SMS-C 285 stores the message and acknowledges receipt with response, e.g., a 202 Accepted response.

At 5B-7, the 202 Accepted response is relayed back to UE 235.

At 8, SMS-C 285 performs a query to HSS 270 to determine the IMS user state and S-CSCF assigned to service UE 280.

At 9, if UE 280 is registered in IMS, then HSS 270 returns the address to S-CSCF 260. Note: If the query to HSS 270 fails, e.g., UE 280 is not IMS registered, then SMS-C 285 may attempt a traditional circuit delivery. If UE 280 is not available in the circuit network, SMS-C 285 may subscribe with HSS 20 for notification when UE 280 registers.

At 10, SMS-C 285 sends a SIP message with encapsulated SMS Delivery content to S-CSCF 260. SMS-C 285 inserts a termination tag (ottag=ue_term) to the S-CSCF 260 SIP URI. The termination tag allows S-CSCF 260 to identify the message and provide mobile termination treatment by forwarding the message to P-CSCF 265.

At 11, S-CSCF 260 forwards the message to P-CSCF 265.

At 12, P-CSCF 265 sends the message to UE 285.

At 13, the SMS client of UE 285 acknowledges receipt with response, e.g., a 200 OK response.

At 14-15, the 200 OK is relayed back to SMS-C 285.

Those skilled in the art will recognize that the aforementioned communication channels, i.e., links, may encompass optical links, wireless links, packet switched channels, direct communication channels, and any combination thereof.

In practice, telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a different order, or steps may be added, deleted, or modified.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of routing end-to-end Internet Protocol (IP) messaging traffic from a first terminal located in an originating network to a second terminal located in a terminating network, the method comprising:
   receiving a message from the first terminal;
   generating a query to a database based on an identifier of the second terminal and a service type indicator in the message to determine a destination server in the terminating network that directly serves the second terminal;
   routing the message to the destination server via a direct path based on receipt of an address indicator from a successful database query.

2. The method of claim 1 wherein the identifier is an E.164 number.

3. The method of claim 1 wherein the message is a Session Initiation Protocol (SIP) message.

4. The method of claim 1 wherein the routing the message further comprises routing the message to bypass an entry point in the terminating network.

5. The method of claim 1 wherein the successful database query occurs on a telephone number mapping (ENUM)/Domain Name System (DNS) database configured to receive and respond to queries based on the service type, and the database is populated with at least one Naming Authority Pointer (NAPTR) record for the service type.

6. The method of claim 5 further comprising routing the message to a Breakout Gateway Control Function (BGCF) configured to route the message to the destination server on a path that bypasses an entry point of the terminating network based on receipt of an indication of an unsuccessful database query.

7. The method of claim 1 further comprising receiving a confirmation that the destination server has received the message.

8. The method of claim 1 wherein the service type indicator indicates a short message service (SMS).

9. The method of claim 1 wherein the service type indicator indicates an Instant Message (IM).

10. The method of claim 1 wherein the destination server is a SMS Center.

11. The method of claim 1 wherein at least one of the first terminal and the second terminal is an Internet Protocol Multimedia Subsystem (IMS) dual-mode mobile terminal.

12. The method of claim 1 wherein the method is performed by a Serving Call Session Control Function (S-CSCF) located in the originating network, the S-CSCF being configured to transmit the message to the destination server on a path that bypasses an entry point of the terminating network.

13. The method of claim 1 wherein the method is performed by a Routing Control Function (RTCF) located in a network other than the originating network and the terminating network, the RTCF being configured to transmit the message to the destination server on a path that bypasses an entry point of the terminating network.

14. An apparatus, comprising:
   means for receiving a message from a first mobile terminal to a second mobile terminal;
   means for generating a query to a database based on an identifier of the second mobile terminal and a service type indicator in the message to determine a destination server in a terminating network that directly serves the second mobile terminal; and
   means for transmitting the message to the destination server via a direct route based on receipt of an address indicator from a successful database query.

15. The apparatus of claim 14 further comprising means for routing the message to bypass an entry point in the terminating network.

16. The apparatus of claim 14 wherein the successful database query occurs on a telephone number mapping (ENUM)/Domain Name System (DNS) database configured to receive and respond to queries based on the service type, and the database is populated with at least one Naming Authority Pointer (NAPTR) record for the service type.

17. The apparatus of claim 16 further comprising means for transmitting the message to a Breakout Gateway Control Function (BGCF) configured to route the message to the destination server based on receipt of an indication of an unsuccessful database query.

18. The apparatus of claim 14 wherein the service type indicator specifies a short message service (SMS) or an Instant Message (IM).

19. The apparatus of claim 14 wherein the destination server is a SMS Center located in the terminating network.

20. A method, comprising:
   receiving a query message from a Serving Call Session Control Function (S-CSCF), the query message including an identifier of a terminal and a service type indicator;
   querying a database for an address of a server that directly serves the terminal based on the identifier of the terminal and the service type indicator, said address being an Internet Protocol address or a Uniform Resource Identifier, the database being populated with at least one Naming Authority Pointer (NAPTR) record for a service type; and
   responding to the S-CSCF with the address when a Naming Authority Pointer (NAPTR) record corresponding to the identifier of the terminal and the service type indicator is determined.

21. A Serving Call Session Control Function (S-CSCF) comprising:
   one or more processors configured to generate a query to a database, based on a received message that contains an identifier of a mobile terminal and a service type indicator, to determine a direct path to a destination server in a terminating network that serves the mobile terminal and bypasses an entry point in the terminating network.

* * * * *